US012573722B2

(12) United States Patent
Li et al.

(10) Patent No.: US 12,573,722 B2
(45) Date of Patent: Mar. 10, 2026

(54) EQUIPOTENTIAL APPARATUS, EQUIPOTENTIAL STRUCTURE, BATTERY AND ELECTRIC DEVICE

(71) Applicant: JIANGSU CONTEMPORARY AMPEREX TECHNOLOGY LIMITED, Liyang City (CN)

(72) Inventors: Xiang Li, Liyang City (CN); Yanlong Gu, Liyang City (CN); Xiaoteng Huang, Liyang City (CN); Weida Ye, Liyang City (CN)

(73) Assignee: JIANGSU CONTEMPORARY AMPEREX TECHNOLOGY LIMITED, Liyang City (CN)

( * ) Notice: Subject to any disclaimer, the term of this patent is extended or adjusted under 35 U.S.C. 154(b) by 913 days.

(21) Appl. No.: 17/540,370

(22) Filed: Dec. 2, 2021

(65) Prior Publication Data

US 2022/0131238 A1      Apr. 28, 2022

Related U.S. Application Data

(63) Continuation of application No. PCT/CN2020/141797, filed on Dec. 30, 2020.

(30) Foreign Application Priority Data

Oct. 27, 2020    (CN) .......................... 202022419532.2

(51) Int. Cl.
*H01M 50/528* (2021.01)
*H01M 50/572* (2021.01)
(Continued)

(52) U.S. Cl.
CPC ....... *H01M 50/528* (2021.01); *H01M 50/572* (2021.01); *H01M 10/625* (2015.04); *H01M 50/249* (2021.01); *H01M 2220/20* (2013.01)

(58) Field of Classification Search
None
See application file for complete search history.

(56) References Cited

U.S. PATENT DOCUMENTS

| | | |
|---|---|---|
| 7,470,866 B2 | 12/2008 | Dietrich et al. |
| 2006/0103081 A1 | 5/2006 | Dietrich et al. |
| 2018/0138491 A1* | 5/2018 | Li .......................... H01M 50/50 |

FOREIGN PATENT DOCUMENTS

| | | |
|---|---|---|
| CN | 205645957 U | 10/2016 |
| CN | 110808482 A | 2/2020 |
| (Continued) | | |

OTHER PUBLICATIONS

Machine translation of CN210628369U (Year: 2020).*
Notice of Reasons for Refusal dated Oct. 2, 2023 received in Japanese Patent Application No. JP 2022-559701.

*Primary Examiner* — Tiffany Legette
*Assistant Examiner* — Christine Disney
(74) *Attorney, Agent, or Firm* — Scully, Scott, Murphy & Presser, P.C.

(57) ABSTRACT

The present application provides an equipotential apparatus, an equipotential structure, a battery and an electric device. The equipotential apparatus includes an electrically-conductive member and an elastic support. The electrically-conductive member is at least partially arranged on a surface of the elastic support, and the elastic support is configured to provide an elastic support force for the electrically-conductive member to achieve an equipotential connection between the first electric conductor and the second electric conductor. After being elastically deformed, the elastic support can provide an elastic support force for the electrically-conductive member. Under the effect of the elastic support force, the electrically-conductive member can be made to be squeezed to the first electric conductor and the second electric conductor, such that the electrically-conductive (Continued)

member is in close contact with the first electric conductor and the second electric conductor.

11 Claims, 10 Drawing Sheets

(51) Int. Cl.
  *H01M 10/625*          (2014.01)
  *H01M 50/249*          (2021.01)

(56)                    References Cited

FOREIGN PATENT DOCUMENTS

| | | | |
|---|---|---|---|
| CN | 210628369 | U | 5/2020 |
| CN | 210984888 | U | 7/2020 |
| JP | 2008021637 | A | 1/2008 |
| JP | 2009087555 | A | 4/2009 |
| JP | 2015216159 | A | 12/2015 |
| JP | 2016103529 | A | 6/2016 |

* cited by examiner

1000

EQUIPOTENTIAL APPARATUS, EQUIPOTENTIAL STRUCTURE, BATTERY AND ELECTRIC DEVICE

CROSS-REFERENCE TO RELATED APPLICATIONS

This application is a continuation of International Application No. PCT/CN2020/141797, filed on Dec. 30, 2020, which claims priority to Chinese Patent Application No. 202022419532.2, filed on Oct. 27, 2020. The disclosures of the aforementioned applications are hereby incorporated by reference in their entireties.

TECHNICAL FIELD

The present application relates to the technical field of batteries and specifically relates to an equipotential apparatus, an equipotential structure, a battery and an electric device.

BACKGROUND

At present, for achieving an equipotential connection between two electric conductors, one end of an equipotential metal sheet is generally fixed to one electric conductor through one bolt and then the other end of the equipotential metal sheet is fixed to the other electric conductor through another bolt, such that the two electric conductors reach a same potential. In such an equipotential structure, it is easy to cause poor contact of the equipotential metal sheet with the electric conductors, resulting in equipotential failure.

SUMMARY

Embodiments of the present application provide an equipotential apparatus, an equipotential structure, a battery and an electric device to improve, through the equipotential metal sheet, a situation in which equipotential failure is easily caused by the equipotential connection between two electric conductors According to a first aspect, embodiments of the present application provides an equipotential apparatus, including an electrically-conductive member and an elastic support, where the electrically-conductive member is at least partially arranged on a surface of the elastic support, and the elastic support is configured to provide an elastic support force for the electrically-conductive member so as to squeeze the electrically-conductive member to a first electric conductor and a second electric conductor to achieve an equipotential connection between the first electric conductor and the second electric conductor.

In the above solution, since the electrically-conductive member is at least partially arranged on the surface of the elastic support and the elastic support has the ability of performing an elastic deformation and recovering from the deformation, after being elastically deformed, the elastic support can provide an elastic support force for the electrically-conductive member. Under the effect of the elastic support force, the electrically-conductive member can be made to be squeezed to the first electric conductor and the second electric conductor, such that the electrically-conductive member is in close contact with the first electric conductor and the second electric conductor, thereby achieving an equipotential connection between the first electric conductor and the second electric conductor. Therefore, it is not easy to cause poor contact of the electrically-conductive member with the first electric conductor and the second electric conductor and equipotential failure of the first electric conductor and the second electric conductor.

In some embodiments, the electrically-conductive member is made of a flexible material.

In the above solution, the electrically-conductive member is made of the flexible material, such that the electrically-conductive member has a flexible deformation ability. Under the effect of the elastic support force provided by the elastic support, the electrically-conductive member is capable of adapting to the first electric conductor and the second electric conductor better, so as to effectively increase a contact area of the electrically-conductive member with the first electric conductor and the second electric conductor.

In some embodiments, the electrically-conductive member covers the surface of the elastic support at a complete circle along a circumferential direction.

In the above solution, the electrically-conductive member covers the surface of the elastic support at a complete circle along the circumferential direction. On one hand, the equipotential apparatus can be rapidly mounted between the first electric conductor and the second electric conductor, without requiring excessive adjustment of the equipotential apparatus' orientation. On the other hand, the elastic support can apply an elastic support force to circumference of the electrically-conductive member and the elastic support can tighten the electrically-conductive member, such that it is not easy for the electrically-conductive member to fall off the elastic support.

In some embodiments, the electrically-conductive member includes one or more of a conductive cloth, a tin foil paper and an aluminum foil paper.

In the above solution, all of the conductive cloth, the tin foil paper and the aluminum foil paper have the ability of conducting electricity and are of favorable flexibility, such that under the effect of the elastic support force provided by the elastic support, they are capable of adapting to the first electric conductor and the second electric conductor better.

In some embodiments, the elastic support includes a first surface and a second surface that are opposite to each other; the electrically-conductive member includes a first conductive portion, a second conductive portion and a third conductive portion, the first conductive portion being connected to the second conductive portion through the third conductive portion; the first conductive portion covers the first surface and the first conductive portion is configured to be squeezed to the first electric conductor; and the second conductive portion covers the second surface and the second conductive portion is configured to be squeezed to the second electric conductor.

In the above solution, since the first conductive portion and the second conductive portion of the electrically-conductive member respectively cover two opposite surfaces (the first surface and the second surface) of the elastic support, the first conductive portion and the second conductive portion are made to be arranged oppositely. The elastic support can apply opposite elastic support forces to the first conductive portion and the second conductive portion, thereby squeezing the first conductive portion and the second conductive portion respectively to the first electric conductor and the second electric conductor.

In some embodiments, a first hole supplied for a connector to pass through is provided on the elastic support.

In the above solution, a first hole is provided on the elastic support to facilitate penetration of the connector. By passing through the first hole through the connector, the elastic support can be stabilized between the first electric conductor and the second electric conductor.

In some embodiments, a second hole and a third hole supplied for the connector to pass through and located at two axial ends of the first hole are provided on the electrically-conductive member.

In the above solution, the second hole and the third hole located at the two axial ends of the first hole are provided on the electrically-conductive member. By passing through the second hole, the first hole and the third hole in order through the connector, the entire equipotential apparatus can be stabilized between the first electric conductor and the second electric conductor. After passing through the second hole, the first hole and the third hole in order, the connector can perform a limiting function to the electrically-conductive member and the elastic support, thereby achieving the purpose of connecting the electrically-conductive member and the elastic support together.

According to a second aspect, embodiments of the present application provide an equipotential structure, including a first electric conductor, a second electric conductor and the equipotential apparatus described above.

The elastic support is configured to provide an elastic support force for the electrically-conductive member so as to squeeze the electrically-conductive member to the first electric conductor and the second electric conductor to achieve an equipotential connection between the first electric conductor and the second electric conductor.

In the above solution, the elastic support of the equipotential apparatus can provide an elastic support force for the electrically-conductive member, such that the electrically-conductive member is in close contact with the first electric conductor and the second electric conductor, thereby achieving the equipotential connection between the first electric conductor and the second electric conductor. Therefore, it is not easy to cause poor contact of the electrically-conductive member with the first electric conductor and the second electric conductor and equipotential failure of the first electric conductor and the second electric conductor.

In some embodiments, the electrically-conductive member and the first electric conductor are connected to each other through a first conductive adhesive layer; and/or the electrically-conductive member and the second electric conductor are connected to each other through a second conductive adhesive layer.

In the above solution, connecting the electrically-conductive member to the first electric conductor through the first conductive adhesive can improve solidity of the electrically-conductive member, such that it is not easy to cause relative dislocation between the electrically-conductive member and the first electric conductor. Connecting the electrically-conductive member to the second electric conductor through the second conductive adhesive can improve solidity of the electrically-conductive member, such that it is not easy to cause relative dislocation between the electrically-conductive member and the second electric conductor.

In some embodiments, the equipotential structure further includes a connector, and the connector is configured to connect the equipotential apparatus between the first electric conductor and the second electric conductor.

In the above solution, connecting the equipotential apparatus between the first electric conductor and the second electric conductor through the connector improves solidity of the entire equipotential apparatus after being mounted.

According to a third aspect, embodiments of the present application provide a battery, including a box, a battery unit, a thermal management member and the equipotential structure described above; the box includes the first electric conductor; the battery unit is accommodated in the box; and the thermal management member is used for managing a temperature for the battery unit and the thermal management member includes the second electric conductor.

In the above solution, the box of the battery includes the first electric conductor in the equipotential structure, and the thermal management member includes the second electric conductor in the equipotential structure, that is, the box and the thermal management member achieve equipotential through the equipotential apparatus, in which case, it is not easy to cause failure of equipotential between the box and the thermal management member, thereby reducing risks of electric shock and improving security of the battery.

According to a fourth aspect, embodiments of the present application further provide an electric device, including the battery described above.

In the above solution, it is not easy to cause failure of the equipotential structure in the battery of the electric device, thereby reducing risks of electric shock and improving security of the electric device.

BRIEF DESCRIPTION OF DRAWINGS

To describe the technical solutions in the embodiments of the present application more clearly, the following briefly describes the accompanying drawings required for describing the embodiments of the present application. Apparently, the accompanying drawings in the following description show merely some embodiments of the present application, and a person of ordinary skill in the art may still derive other drawings from these accompanying drawings without creative efforts.

Figure 1:
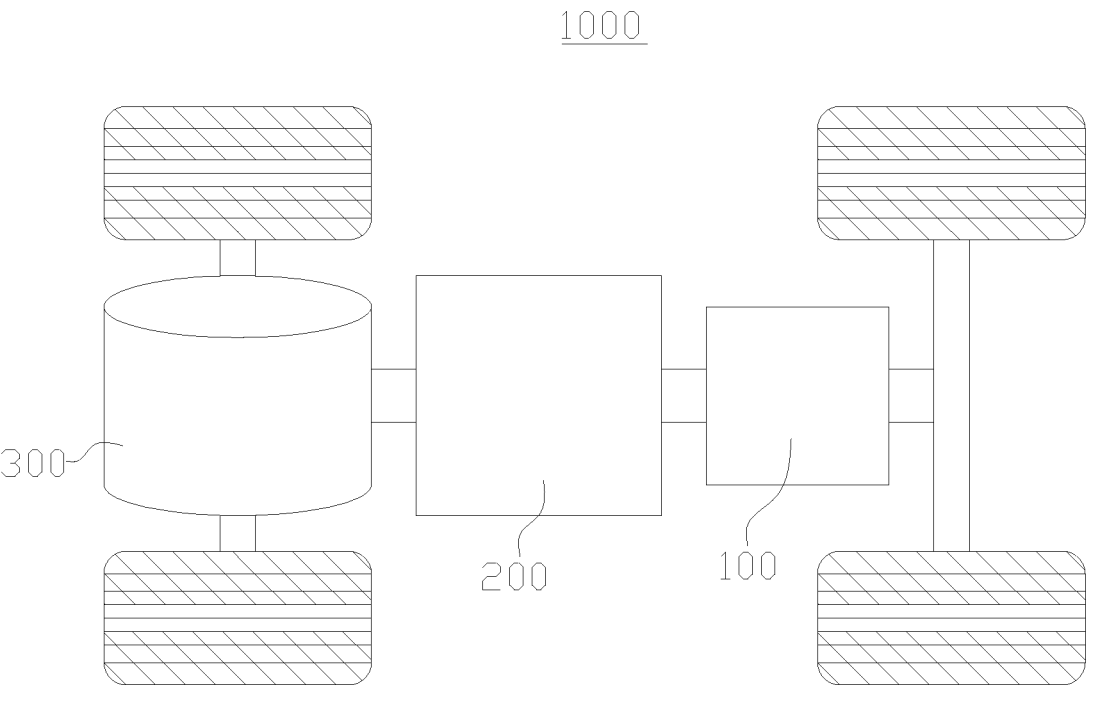
FIG. 1 is a schematic structural diagram of a vehicle provided in some embodiments of the present application.

Of the accompanying drawings, the accompanying drawings are not drawn according to actual proportions.

REFERENCE SIGNS

10—box; 11—box body; 111—side wall; 112—bottom wall; 12—box cover; 20—battery unit; 30—thermal management member; 40—equipotential structure; 41—first electric conductor; 411—contact surface; 42—second electric conductor; 43—equipotential apparatus; 431—electrically-conductive member; 4311—first conductive portion; 4312—second conductive portion; 4313—third conductive portion; 4314—fourth conductive portion; 4315—second hole; 4316—third hole; 432—elastic support; 4321—first surface; 4322—second surface; 4323—third surface; 4324—fourth surface; 4325—first hole; 44—middle electric conductor; 45—first conductive adhesive layer; 46—second conductive adhesive layer; 47—connector; 48—fixing member; 100—battery; 200—controller; 300—motor; and 1000—vehicle.

DESCRIPTION OF EMBODIMENTS

The following further describes the implementations of the present application in detail with reference to the accompanying drawings and embodiments. Detailed description of the following embodiments and accompanying drawings are used to illustratively state the principles of the present application, but not to limit the scope of the present application, that is, the present application is not limited to the embodiments described.

In the descriptions of the present application, it should be noted that unless otherwise described additionally, "plural" means more than two; and the orientations or positional relationships indicated by the terms "up", "down", "left", "right", "inside", "outside", and the like are merely intended to facilitate the descriptions of the present application and simplify the descriptions, but not intended to indicate or imply that the apparatuses or components mentioned must have specific orientations, or be constructed and operated for a specific orientation, and therefore shall not be understood as a limitation to the present application. In addition, the terms "first", "second" and "third" etc. are merely intended for a purpose of description, and shall not be understood as an indication or implication of relative importance. "Vertical" does not mean vertical in the strict sense, but to be vertical within a permitted range of an error. "Parallel" does not mean parallel in the strict sense, but to be parallel within a permitted range of an error.

The location words appearing in the following descriptions are all directions indicated in the drawings, but not to constitute any limitation to the specific structure of the present application. In the description of the present application, it should be further noted that unless otherwise prescribed and defined clearly, terms "mounting", "communicating" and "connection" should be understood in a broad sense, which for example can be a fixed connection and can also be a detachable connection or an integral connection; or can be a direct connection and can also be a connection through an intermediary. A person of ordinary skill in the art can understand specific meanings of these terms in the present application based on specific situations.

The battery provided in embodiments of the present application refers to a single physical module including one or more battery units to provide higher voltage and capacity. For example, the battery mentioned in the present application can include a battery module or a battery pack etc. The battery generally includes a box for packaging one or more battery units. The battery unit includes one or more battery cells. If the battery unit includes a plurality of battery cells, the plurality of battery cells can be in series connection and/or parallel connection together through a converging piece. The box can prevent liquid or other foreign material from affecting charging or discharging of the battery cell.

In the present application, the battery cell can include a lithium-ion secondary battery, a lithium-ion primary battery, a lithium-sulfur battery, a sodium-lithium-ion battery, a sodium-ion battery or a magnesium-ion battery etc., which are not limited by embodiments of the present application herein. The battery cell can be of such shapes as a cylinder, a flat body, a cuboid or other shapes, which are also not limited by embodiments of the present application. The battery cell is generally divided into three types according to a packaging manner; a column-shaped battery cell, a rectangle-shaped battery cell and a soft-package battery cell, which are also not limited by embodiments of the present application.

The battery cell includes an electrode assembly and an electrolytic solution, the electrode assembly being composed of an anode piece, a cathode piece and an isolating film. The battery cell mainly works by depending on movement of a metal ion between the anode piece and the cathode piece. The anode piece includes a positive current collector and a positive active substance layer, the positive active substance layer being coated on a surface of the positive current collector. The positive current collector without being coated with the positive active substance layer protrudes outside the positive current collector coated with the positive active substance layer and the positive current collector without being coated with the positive active substance layer serves as a positive tab. With the lithium-ion battery as an example, the material of the positive current collector can be aluminum and the positive active substance can be lithium cobalt oxide, lithium iron phosphate, ternary lithium or lithium manganese oxide etc. The cathode piece includes a negative current collector and a negative active substance layer, the negative active substance layer being coated on a surface of the negative current collector. The negative current collector without being coated with the cathode active substance layer protrudes outside the negative current collector coated with the negative active substance layer and the negative current collector without being coated with the negative active substance layer serves as a negative tab. The material of the negative current collector can be copper and the negative active substance can be carbon or silicon etc. In order to ensure pass of big current without occurrence of fusing, there are multiple positive tabs, which are stacked together, and there are multiple negative tabs, which are stacked together. The material of the isolating film can be PP (polypropylene) or PE (polyethylene) etc. In addition, the electrode assembly can be of a winding-type structure and can also be of a stack-type structure, which are not limited by embodiments of the present application.

For an electric device with a high voltage, it is generally required to perform protection against electric shock, such as an equipotential connection, to decrease the risks of electric shock occurring to the electric device. For achieving equipotential between two electric conductors, one end of an equipotential metal sheet is generally fixed to one electric conductor through one bolt and then the other end of the equipotential metal sheet is fixed to the other electric conductor through another bolt, such that the two electric conductors reach a same potential, thereby achieving an equipotential connection between the two electric conductors. When a human body contacts the two electric conductors, current will not be generated as no potential difference is present between the two electric conductors, thereby avoiding an electric shock accident.

The inventor finds: in such an equipotential structure, if the bolt is loose, it is easy to cause poor contact of the equipotential metal sheet with the electric conductors, resulting in equipotential failure.

In view of this, embodiments of the present application provide an electric device, a battery, an equipotential structure and an equipotential apparatus, to improve, through the equipotential metal sheet, a situation in which equipotential failure is easily caused by the equipotential connection between two electric conductors.

Embodiments of the present application provide an electric device, which can be a vehicle, a mobile phone, a portable device, a laptop computer, a ship, a spacecraft, an electric toy and an electric tool etc. The vehicle can be a fuel-engined automobile, a fuel gas automobile or a new energy automobile, and the new energy automobile can be a pure electric automobile or a hybrid power automobile or an extended-range automobile etc. The spacecraft includes an airplane, a rocket, a spaceship and a space vehicle etc. The electric toy includes a fixed or movable electric toy, such as a game console, an electric automobile toy, an electric ship toy and an electric airplane toy etc. The electric tool includes a metal cutting electric tool, a grinding electric tool, an assembling electric tool and an electric tool for a rail, such as an electric drill, an electric grinding machine, an electric wrench, an electric screwdriver, an electric hammer, an impact drill, a concrete vibrator and an electric planer etc. Embodiments of the present application do not make any special restriction to the above electric device.

For convenient statement, the following embodiments make a description with an example of taking the electric device as the vehicle.

Please referring to FIG. 1, a battery 100 is provided inside a vehicle 1000, where the battery 100 can be provided at a bottom or a head or a tail of the vehicle 1000. The battery 100 can be used to power the vehicle 1000. For example, the battery 100 can serve as an operating power supply of the vehicle 1000.

The vehicle 1000 further includes a controller 200 and a motor 300, where the controller 200 is configured to control the battery 100 to power the motor 300, for example, for working power requirements for starting, navigating and driving of the vehicle 1000.

In some embodiments of the present application, the battery 100 can not only serve as an operating power supply of the vehicle 1000, but also serve as a driving power supply of the vehicle 1000, thereby replacing or partially replacing fuel oil or natural gas to provide a driving power for the vehicle 1000.

Figure 2:
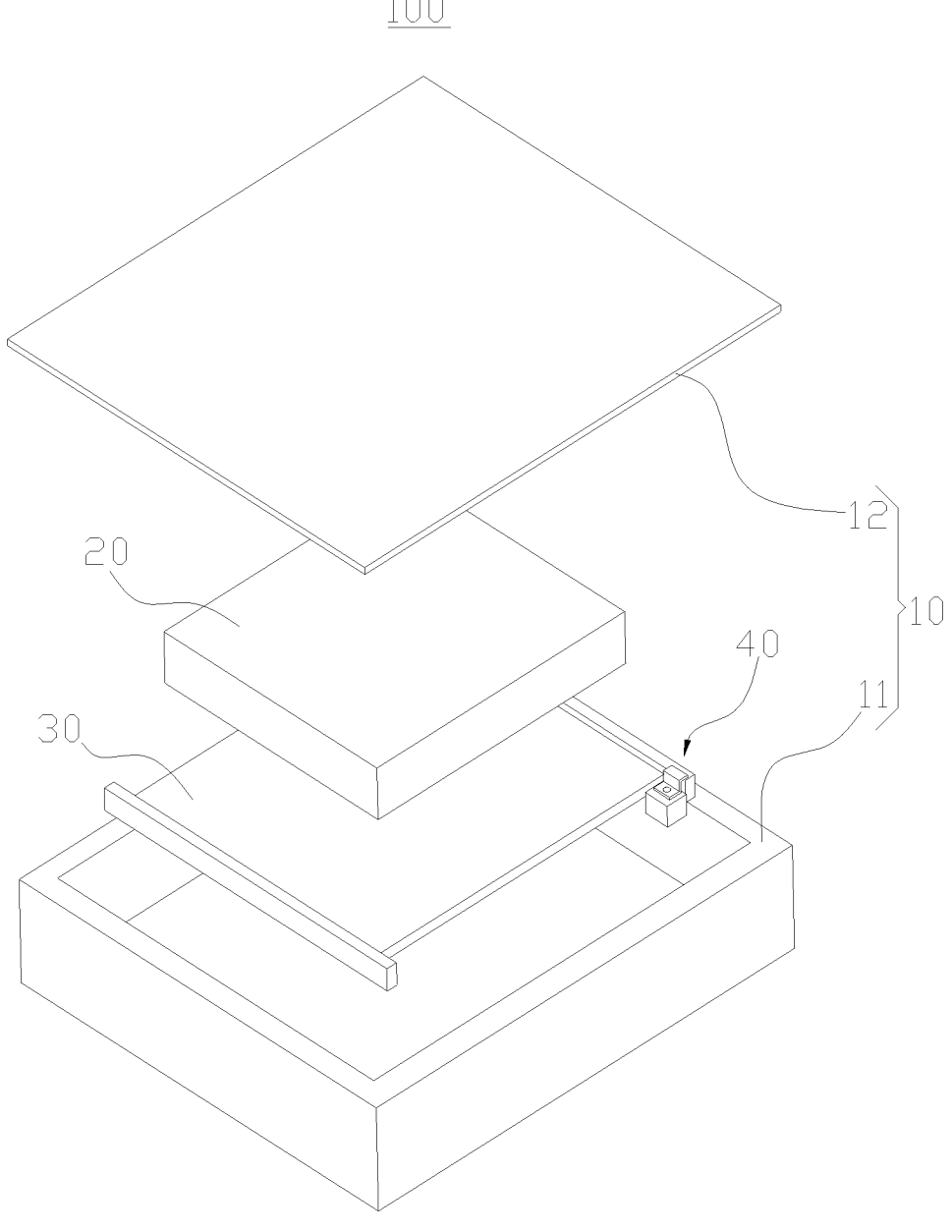
FIG. 2 is an exploded view of a battery provided in some embodiments of the present application.

Please referring to FIG. 2, the battery 100 provided in embodiments of the present application includes a box 10, a battery unit 20, a thermal management member 30 and an equipotential structure 40.

The battery unit 20 is located in the box 10 and the thermal management member 30 is used to managing a temperature for the battery unit 20.

Illustratively, the box 10 includes a box body 11 and a box cover 12, the box cover 12 covers a top opening of the box body 11, and the box cover 12 and the box body 11 form a sealing connection to provide a sealing environment for the battery unit 20.

The thermal management member 30 functions to manage the temperature for the battery unit 20, the thermal management member 30 and the battery unit 20 form a heat conducting connection, the thermal management member 30 and the battery unit 20 can directly contact each other to achieve a heat conducting connection, and the thermal management member 30 and the battery unit 20 can also achieve a heat conducting connection by conducting heat through a middleware. The thermal management member 30 can be a heat dissipation element for dissipating heat of the battery unit 20 and can also be a heating element for heating the battery 100.

Illustratively, in FIG. 2, the thermal management member 30 is a heat dissipation element for dissipating heat of the battery unit 20, the thermal management member 30 can be a liquid cooling plate, and the liquid cooling plate can be mounted in the box 10.

Figures 3, 4:
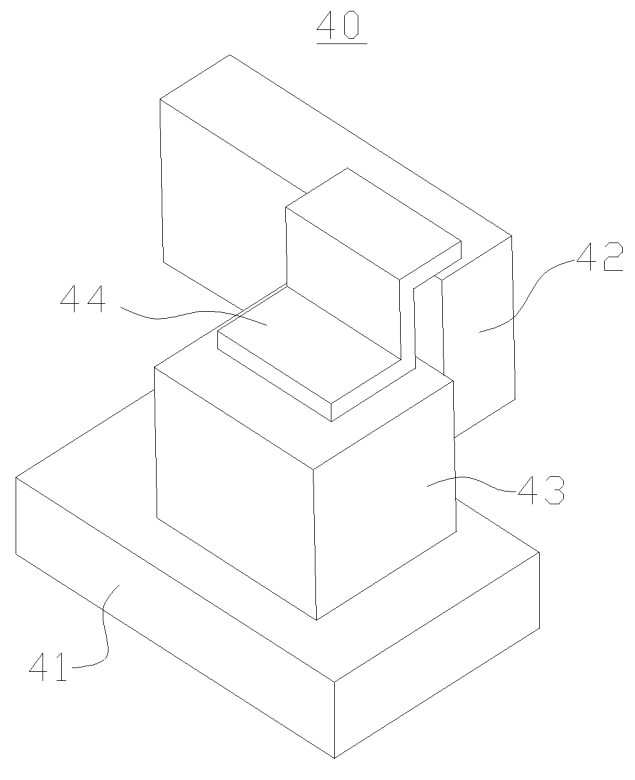
FIG. 3 is a schematic diagram of an equipotential structure shown in FIG. 2.
FIG. 4 is a schematic diagram of an equipotential structure provided in some embodiments of the present application.

Please referring to FIG. 3 and FIG. 4, the equipotential structure 40 provided in embodiments of the present application includes a first electric conductor 41, a second electric conductor 42 and an equipotential apparatus 43, where the first electric conductor 41 and the second electric conductor 42 are connected to each other equipotentially through the equipotential apparatus 43.

In the battery 100 (shown in FIG. 2), the box 10 (shown in FIG. 2) includes the first electric conductor 41 in the equipotential structure 40. It can be understood that the first electric conductor 41 can be a part of the box 10. The first electric conductor 41 can be a part of the box body 11 of the box 10 and the first electric conductor 41 can also be a part of the box cover 12 of the box body 10. The first electric conductor 41 can be a metal conductor, such as copper, iron, aluminum, stainless steel and the like.

In the battery 100 (shown in FIG. 2), the thermal management member 30 (shown in FIG. 2) includes the second electric conductor 42 in the equipotential structure 40. It can be understood that the second electric conductor 42 can be a part of the thermal management member 30. The second electric conductor 42 can be a metal conductor, such as copper, iron, aluminum, stainless steel and the like.

It should be noted that through the equipotential apparatus 43, equipotential of the first electric conductor 41 and the second electric conductor 42 is achieved, by directly or indirectly squeezing the equipotential apparatus 43 between the first electric conductor 41 and the second electric conductor 42, such that the first electric conductor 41 and the second electric conductor 42 are electrically connected to each other through the equipotential apparatus 43, thereby achieving equipotential.

In some embodiments, please referring to FIG. 3, the equipotential apparatus 43 is indirectly squeezed between the first electric conductor 41 and the second electric conductor 42. A middle electric conductor 44 is provided on the second electric conductor 42 and the equipotential apparatus 43 is directly squeezed between the first electric conductor 41 and the middle electric conductor 44.

In an actual application, if the first electric conductor 41 and the second electric conductor 42 are provided staggeredly, in this case, a middle electric conductor 44 may be provided on the second electric conductor 42 such that the middle electric conductor 44 and the first electric conductor 41 are provided oppositely to facilitate mounting of the equipotential apparatus 43.

The middle electric conductor 44 and the second electric conductor 42 can be connected together through welding, bonding, bolt connection and the like, as long as electrical connection of the middle electric conductor 44 and the second electric conductor 42 can be achieved.

Illustratively, the middle electric conductor 44 is a conducting strip bent in a Z shape.

In other embodiments, according to the actual requirements, a middle electric conductor 44 may also be provided on the first electric conductor 41 only and the equipotential apparatus 43 is directly squeezed between the second electric conductor 42 and the middle electric conductor 44. Certainly, a middle electric conductor 44 may also be provided on the first electric conductor 41 and the second electric conductor 42 and the equipotential apparatus 43 is directly squeezed between two middle electric conductors 44.

In some embodiments, please referring to FIG. 4, the equipotential apparatus 43 is directly squeezed between the first electric conductor 41 and the second electric conductor 42, that is, the equipotential apparatus 43 and the first electric conductor 41 are directly squeezed with each other, and the equipotential apparatus 43 and the second electric conductor 42 are directly squeezed with each other.

In an actual application, if the first electric conductor 41 and the second electric conductor 42 are provided oppositely, the equipotential apparatus 43 can be directly mounted between the first electric conductor 41 and the second electric conductor 42.

Figures 5, 6:
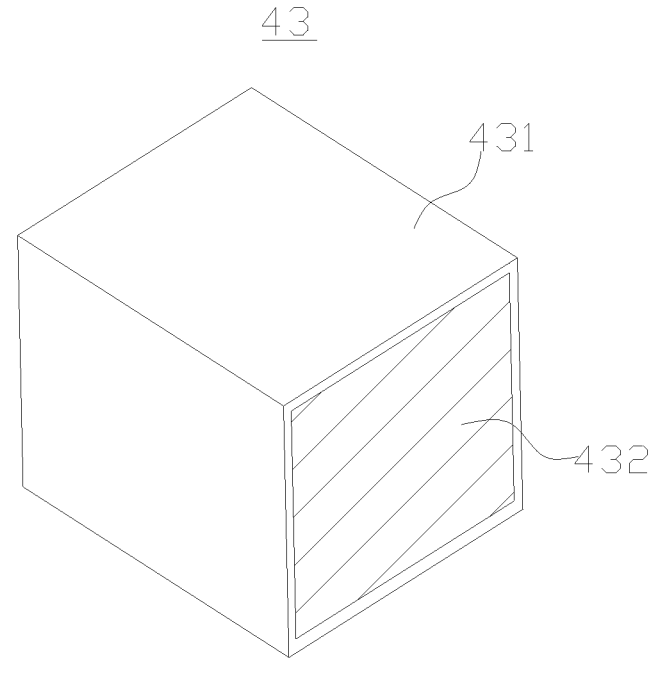
FIG. 5 is a schematic structural diagram of an equipotential apparatus provided in some embodiments of the present application.
FIG. 6 is a working diagram of an equipotential apparatus provided in some embodiments of the present application.

Please referring to FIG. 5, the equipotential apparatus 43 provided in embodiments of the present application includes an electrically-conductive member 431 and an elastic support 432. The electrically-conductive member 431 is at least partially arranged on a surface of the elastic support 432, and the elastic support 432 is configured to provide an elastic support force for the electrically-conductive member 431 so as to squeeze the electrically-conductive member 431 to a first electric conductor 41 (not shown in FIG. 5) and a second electric conductor 42 (not shown in FIG. 5) to achieve an equipotential connection between the first electric conductor 41 and the second electric conductor 42.

Since the electrically-conductive member 431 is at least partially arranged on the surface of the elastic support 432 and the elastic support 432 has the ability of performing an elastic deformation and recovering from the deformation, after being elastically deformed, the elastic support 432 can provide an elastic support force for the electrically-conductive member 431. Under the effect of the elastic support force, the electrically-conductive member 431 can be made to be squeezed to the first electric conductor 41 and the second electric conductor 42, such that the electrically-conductive member 431 is in close contact with the first electric conductor 41 and the second electric conductor 42, thereby achieving the equipotential connection between the first electric conductor 41 and the second electric conductor 42. Therefore, it is not easy to cause poor contact of the electrically-conductive member 431 with the first electric conductor 41 and the second electric conductor 42 or cause equipotential failure of the first electric conductor 41 and the second electric conductor 42.

It should be noted that the electrically-conductive member 431 is squeezed to the first electric conductor 41 and the second electric conductor 42, and the electrically-conductive member 431 can be directly squeezed to the first electric conductor 41 and the second electric conductor 42 and can also be indirectly squeezed to the first electric conductor 41 and the second electric conductor 42. For example, in a case where a middle electric conductor 44 (shown in FIG. 3) is provided on the second electric conductor 42, the electrically-conductive member 431 is directly squeezed to the middle electric conductor 44, thereby achieving that the electrically-conductive member 431 is indirectly squeezed to the second electric conductor 42.

In embodiments of the present application, the elastic support 432 performs a support function for the electrically-conductive member 431 and the elastic support 432 can be made of multiple materials. The elastic support 432 can be a foam, and an elastic rubber etc.

The elastic support 432 can be of multiple shapes, such as a cuboid, a gengon and a circle etc. The following embodiments describe the equipotential apparatus 43 in details with an example of taking the elastic support 432 as the cuboid.

In some embodiments, the electrically-conductive member 431 is made of a flexible material, such that the electrically-conductive member 431 has a flexible deformation ability. Under the effect of the elastic support force provided by the elastic support 432, the electrically-conductive member 431 is capable of adapting to the first electric conductor 41 and the second electric conductor 42 better, so as to effectively increase a contact area of the electrically-conductive member 431 with the first electric conductor 41 and the second electric conductor 42.

Please referring to FIG. 6, with an example of taking a contact surface 411 of the first electric conductor 41 that is in contact with the elastic support 432 as an uneven curved surface, since the electrically-conductive member 431 has a flexible deformation ability, the electrically-conductive member 431 curves and deforms under the effect of the elastic support force of the elastic support 432 with the shape of the contact surface 411, such that the electrically-conductive member 431 is tightly attached to the second electric conductor 42, achieving the purpose of increasing a contact area of the electrically-conductive member 431 and the first electric conductor 41.

The electrically-conductive member 431 can be one or more of a conductive cloth, a tin foil paper and an aluminum foil paper.

The elastic support 432 can be completely wrapped in the electrically-conductive member 431 or the electrically-conductive member 431 only covers a part of the elastic support 432. The electrically-conductive member 431 can be completely located on a surface of the elastic support 432 and can also be partially located on the surface of the elastic support 432.

Figure 7:
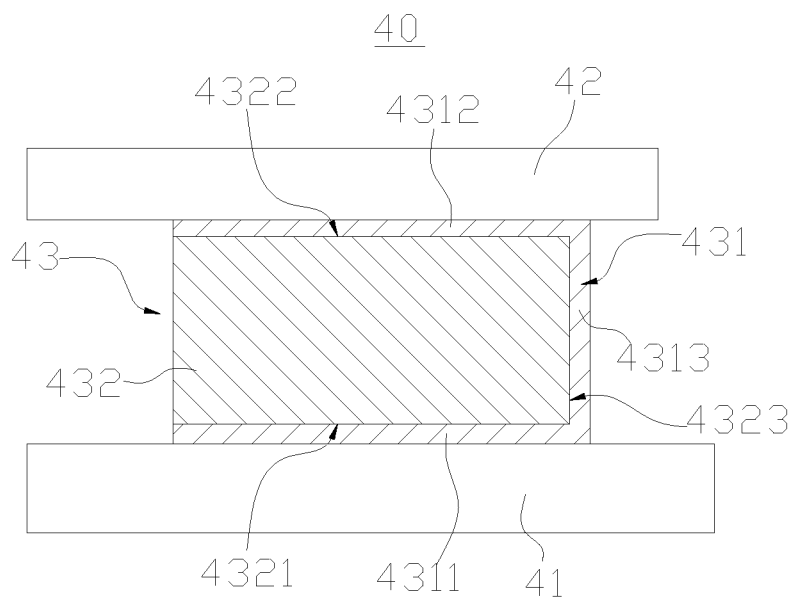
FIG. 7 is a schematic diagram of an equipotential structure (a first possible structural form of the equipotential apparatus) provided in some embodiments of the present application.
Figure 8:
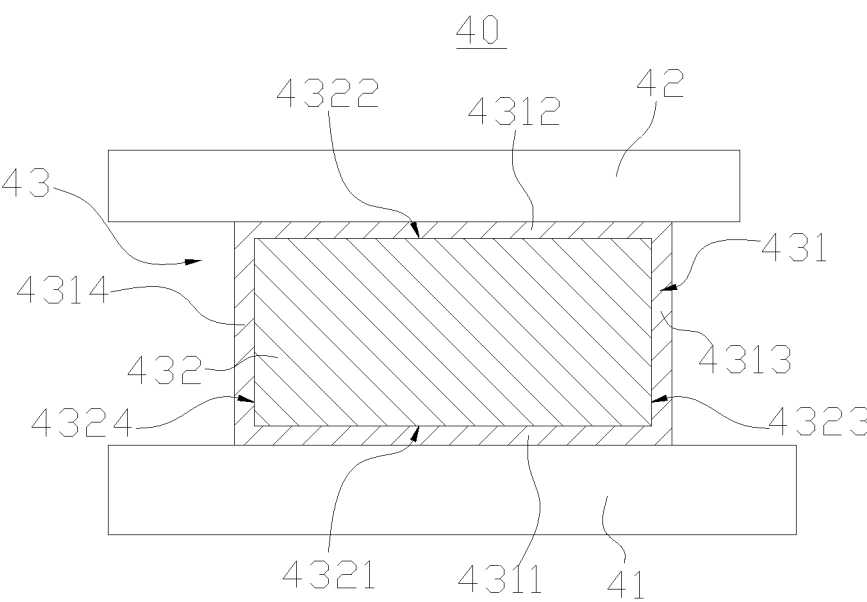
FIG. 8 is a schematic diagram of an equipotential structure (a second possible structural form of the equipotential apparatus) provided in some embodiments of the present application.

Please referring to FIGS. 7 and 8, the electrically-conductive member 431 only covers a part of the elastic support 432.

In some embodiments, please referring to FIG. 7, the electrically-conductive member 431 covers a surface of the elastic support 432 at a non-complete circle along a circumferential direction.

Illustratively, the elastic support 432 includes a first surface 4321 and a second surface 4322 that are opposite to each other; the electrically-conductive member 431 includes a first conductive portion 4311, a second conductive portion 4312 and a third conductive portion 4313, the first conductive portion 4311 being connected to the second conductive portion 4312 through the third conductive portion 4313. The first conductive portion 4311 covers the first surface 4321 and the first conductive portion 4311 is configured to be squeezed to the first electric conductor 41 under the effect of the elastic support 432. The second conductive portion 4312 covers the second surface 4322 and the second conductive portion 4312 is configured to be squeezed to the second electric conductor 42 under the effect of the elastic support 432.

Since the first conductive portion 4311 and the second conductive portion 4312 of the electrically-conductive member 431 respectively cover the first surface 4321 and the second surface 4322 of the elastic support 432 that are arranged oppositely, the first conductive portion 4311 and the second conductive portion 4312 are made to be arranged oppositely. The elastic support 432 can apply opposite elastic support forces to the first conductive portion 4311 and the second conductive portion 4312, thereby squeezing the first conductive portion 4311 and the second conductive portion 4312 respectively to the first electric conductor 41 and the second electric conductor 42.

Upon actually mounting the equipotential apparatus 43, if a gap between the first electric conductor 41 and the second electric conductor 42 is fixed, since the elastic support 432 has a deformation ability, the equipotential apparatus 43 can be pressed, such that a distance between the first conductive portion 4311 and the second conductive portion 4312 decreases. After the equipotential apparatus 43 is placed between the first electric conductor 41 and the second electric conductor 42, the equipotential apparatus 43 is released and the first conductive portion 4311 and the second conductive portion 4312 are away from each other under the effect of the elastic support 432, such that the first conductive portion 4311 and the second conductive portion 4312 are respectively squeezed to the first electric conductor 41 and the second electric conductor 42 tightly.

In the embodiment, the elastic support 432 further includes a third surface 4323, where the first surface 4321, the third surface 4323 and the second surface 4322 are connected in order, and the first surface 4321, the third surface 4323 and the second surface 4322 are three consecutive side surfaces of the elastic support 432. The first conductive portion 4311, the third conductive portion 4313 and the second conductive portion 4312 are connected in order and the third conductive portion 4313 covers the third surface 4323.

In some embodiments, please referring to FIG. 8, the electrically-conductive member 431 covers a surface of the elastic support 432 at a complete circle along a circumferential direction. On one hand, with such a structure, the equipotential apparatus 43 can be rapidly mounted between the first electric conductor 41 and the second electric conductor 42, without requiring excessive adjustment of the equipotential apparatus' orientation. On the other hand, the elastic support 432 can apply an elastic support force to circumference of the electrically-conductive member 431 and the elastic support 432 can tighten the electrically-conductive member 431, such that it is not easy for the electrically-conductive member 431 to fall off the elastic support 432.

In the embodiment, the elastic support 432 further includes a fourth surface 4324, where the first surface 4321, the third surface 4323, the second surface 4322 and the fourth surface 4324 are end-to-end connected in order, and the first surface 4321, the third surface 4323, the second surface 4322 and the fourth surface 4324 are four side surfaces of the elastic support 432. The electrically-conductive member 431 further includes a fourth conductive portion 4314, and the fourth conductive portion 4314 covers the fourth surface 4324. The first conductive portion 4311, the third conductive portion 4313, the second conductive portion 4312 and the fourth conductive portion 4314 are end-to-end connected in order, that is, the electrically-conductive member 431 is a hollow structure with two ends thereof open.

Figure 9:
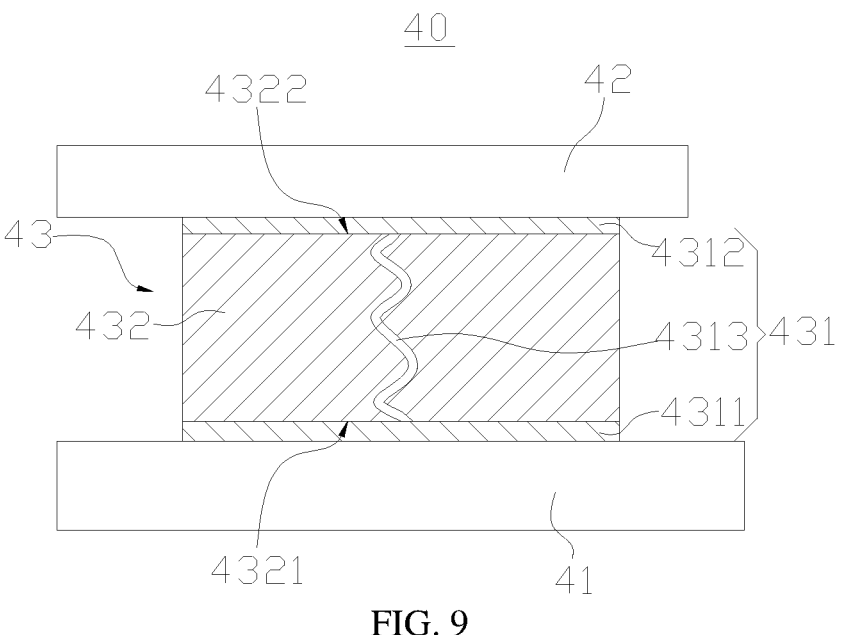
FIG. 9 is a schematic diagram of an equipotential structure (a third possible structural form of the equipotential apparatus) provided in some embodiments of the present application.

In some embodiments, please referring to FIG. 9, the electrically-conductive member 431 is only partially located on a surface of the elastic support 432.

The first conductive portion 4311 and the second conductive portion 4312 of the electrically-conductive member 431 respectively cover the first surface 4321 and the second surface 4322 of the elastic support 432, the third conductive portion 4313 is located in the elastic support 432, and two ends of the third conductive portion 4313 are respectively connected to the first conductive portion 4311 and the second conductive portion 4312 to achieve an electrical connection between the first conductive portion 4311 and the second conductive portion 4312.

Since the third conductive portion 4313 is located in the elastic support 432 and two ends of the third conductive portion 4313 are respectively connected to the first conductive portion 4311 and the second conductive portion 4312, when the equipotential apparatus 43 is not mounted between the first electric conductor 41 and the second electric conductor 42, the elastic support 432 can apply an elastic support force to the first conductive portion 4311 and the second conductive portion 4312, thereby enabling the first conductive portion 4311 and the second conductive portion 4312 to jointly straighten the third conductive portion 4313. As a result, the third conductive portion 4313 generates a traction effect on the first conductive portion 4311 and the second conductive portion 4312, such that the first conductive portion 4311 and the second conductive portion 4312 are tightly squeezed on the first surface 4321 and the second surface 4322 respectively, thereby ensuring favorable solidity of the electrically-conductive member 431 and the elastic support 432 before the equipotential apparatus 43 is mounted between the first electric conductor 41 and the second electric conductor 42.

In the above structure, the electrically-conductive member 431 is not necessarily required to be made of a flexible material as a whole, as long as the third conductive portion 4313 is made of a flexible material. However, the first conductive portion 4311 and the second conductive portion 4312 can be made of rigid materials. For example, the first conductive portion 4311 and the second conductive portion 4312 are metal conductive sheets and the third conductive portion 4313 is a conductive cloth. Certainly, the third conductive portion 4313 can also be a wire.

Figure 10:
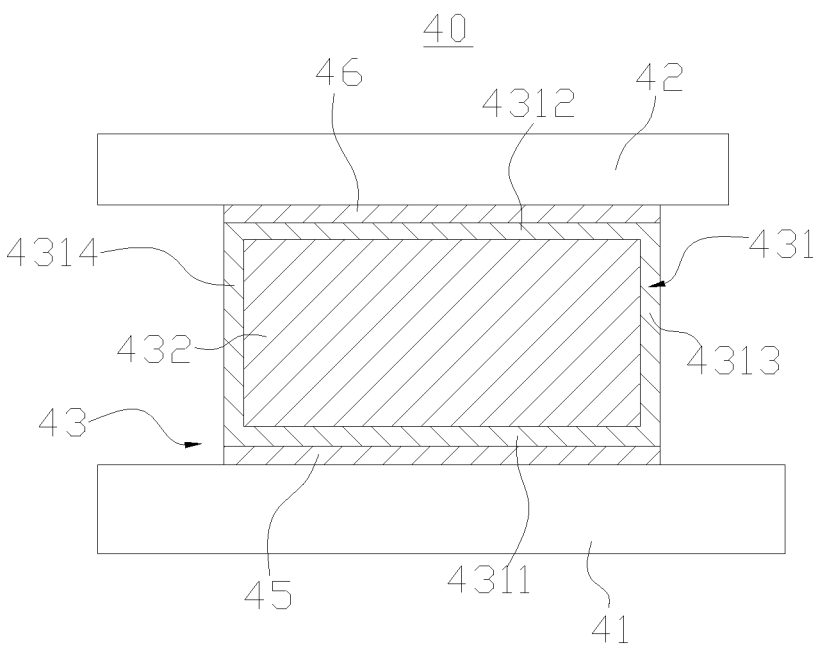
FIG. 10 is a first possible mounting diagram of an equipotential apparatus provided in some embodiments of the present application.

In some embodiments, please referring to FIG. 10, the electrically-conductive member 431 and the first electric conductor 41 are connected to each other through a first conductive adhesive layer 45, and the electrically-conductive member 431 and the second electric conductor 42 are connected to each other through a second conductive adhesive layer 46.

Connecting the electrically-conductive member 431 to the first electric conductor 41 through the first conductive adhesive and connecting the electrically-conductive member 431 to the second electric conductor 42 through the second conductive adhesive can improve solidity of the electrically-conductive member 431, such that it is not easy to cause relative dislocation between the electrically-conductive member 431 and the second electric conductor 42.

The first conductive portion 4311 of the electrically-conductive member 431 and the first electric conductor 41 are connected to each other through the first conductive adhesive layer 45, and the second conductive portion 4312 of the electrically-conductive member 431 and the second electric conductor 42 are connected to each other through the second conductive adhesive layer 46.

Certainly, it can also be a case where only the electrically-conductive member 431 and the first electric conductor 41 are connected to each other through the first conductive adhesive layer 45, and a case where only the electrically-conductive member 431 and the second electric conductor 42 are connected to each other through the second conductive adhesive layer 46.

Figure 11:
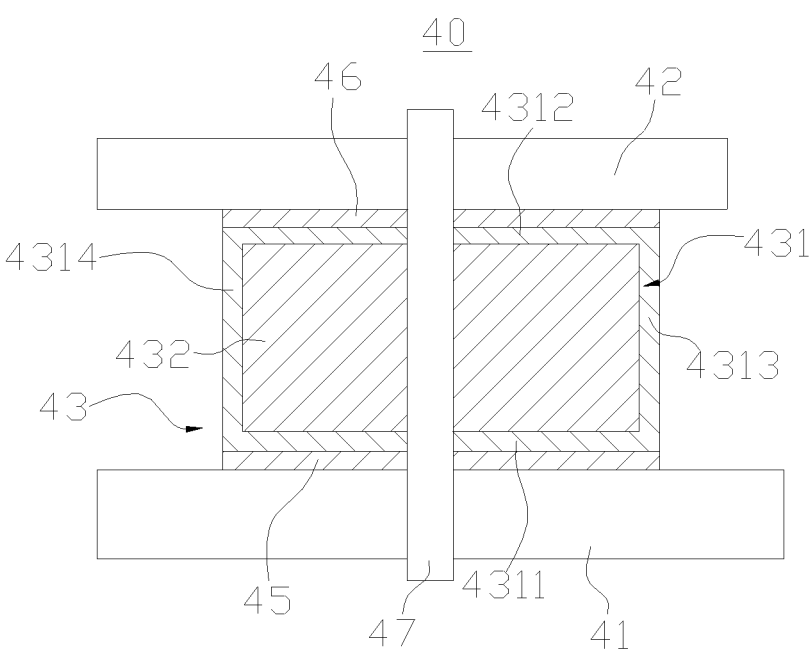
FIG. 11 is a second possible mounting diagram of an equipotential apparatus provided in some embodiments of the present application.

In some embodiments, please referring to FIG. 11, based on the above embodiment, the equipotential structure 40 further includes a connector 47, where the connector 47 is configured to connect the equipotential apparatus 43 between the first electric conductor 41 and the second electric conductor 42.

Connecting the equipotential apparatus 43 between the first electric conductor 41 and the second electric conductor 42 through the connector 47 can further improve solidity of the equipotential apparatus 43 after being mounted.

The connector 47 can be a bolt that performs a locking function and can also a locking pin that performs a locating function.

Figure 12:
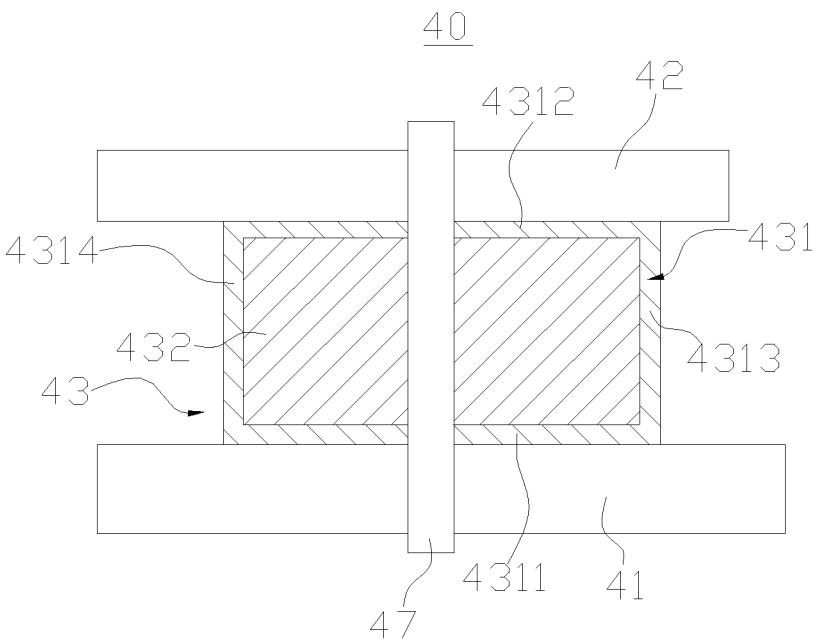
FIG. 12 is a third possible mounting diagram of an equipotential apparatus provided in some embodiments of the present application.

In some embodiments, please referring to FIG. 12, when the electrically-conductive member 431 and the first electric conductor 41, and the electrically-conductive member 431 and the second electric conductor 42 are not connected to each other through conductive adhesive layers (the first conductive adhesive layer 45 and the second conductive adhesive layer 46), the equipotential apparatus 43 can also be directly connected between the first electric conductor 41 and the second electric conductor 42 through the connector 47, thereby achieving the purpose of fixing the equipotential apparatus 43.

Figure 13:
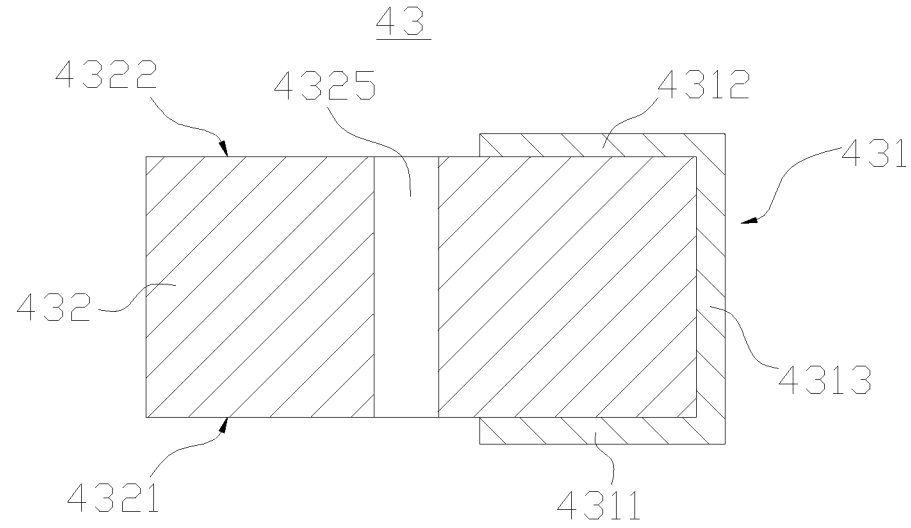
FIG. 13 is a schematic structural diagram of an equipotential apparatus (an elastic support is provided with a first hole) provided in some embodiments of the present application.

In some embodiments, please referring to FIG. 13, a first hole 4325 supplied for a connector 47 to pass through is provided on the elastic support 432. Two ends of the first hole 4325 respectively penetrate the first surface 4321 and the second surface 4322 of the elastic support 432.

In the embodiment, the electrically-conductive member 431 only covers a local part of the first surface 4321 and the second surface 4322.

Figure 14:
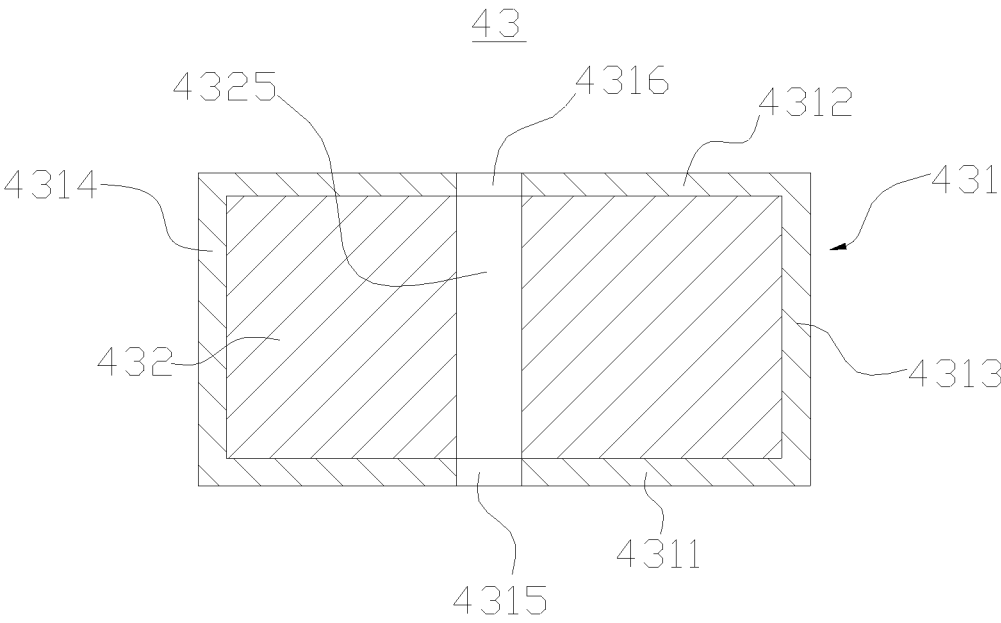
FIG. 14 is a schematic structural diagram of an equipotential apparatus (an elastic support is provided with a first hole and an electrically-conductive member is provided with a second hole and a third hole) provided in some embodiments of the present application.
Figure 15:
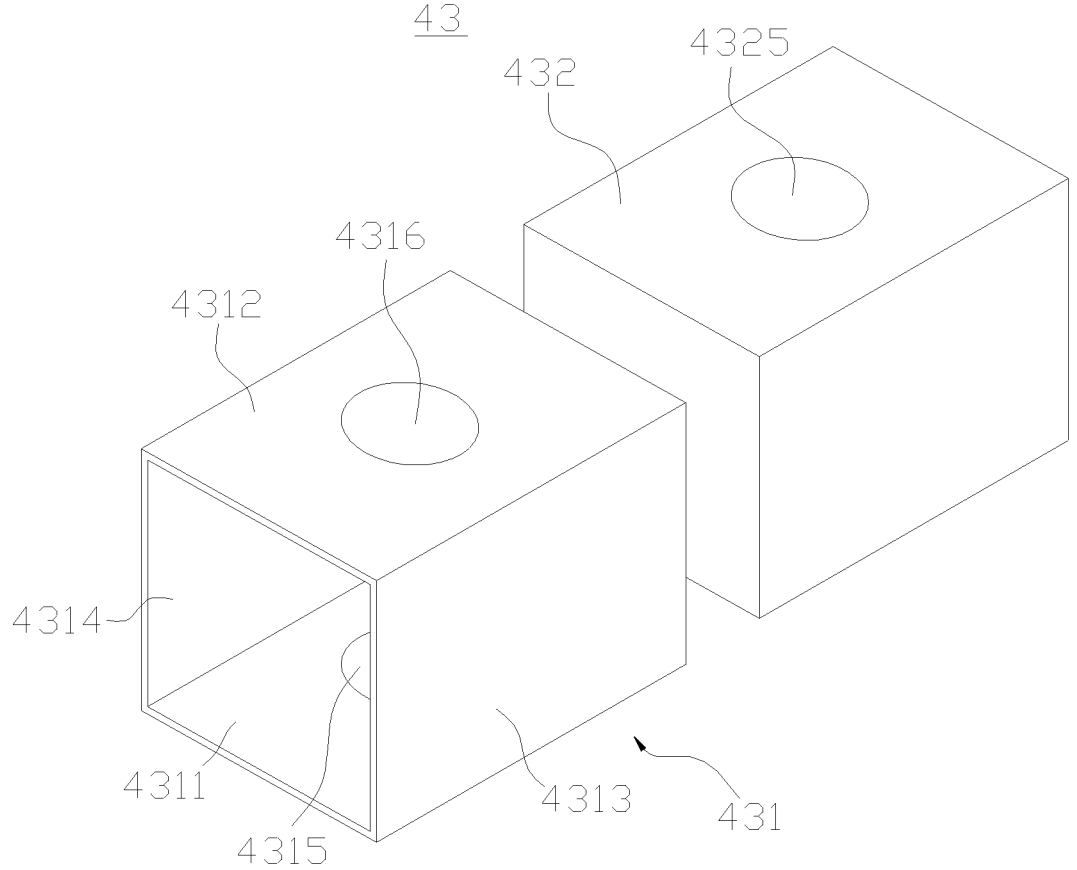
FIG. 15 is an exploded view of an equipotential apparatus shown in FIG. 14.

In some embodiments, please referring to FIGS. 14 and 15, a second hole 4315 and a third hole 4316 supplied for the connector 47 to pass through and located at two axial ends of the first hole 4325 are provided on the electrically-conductive member 431.

The second hole 4315 and the third hole 4316 are respectively provided on the first conductive portion 4311 and the second conductive portion 4312 of the electrically-conductive member 431.

By passing through the second hole 4315, the first hole 4325 and the third hole 4316 in order through the connector 47, the entire equipotential apparatus 43 can be stabilized between the first electric conductor 41 and the second electric conductor 42. After the connector 47 passes through the second hole 4315, the first hole 4325 and the third hole 4316 in order, the connector 47 can perform a limiting function to the electrically-conductive member 431 and the elastic support 432, thereby achieving the purpose of connecting the electrically-conductive member 431 and the elastic support 432 together.

In the embodiments, the electrically-conductive member 431 covers a surface of the elastic support 432 at a complete circle along a circumferential direction.

Figure 16:
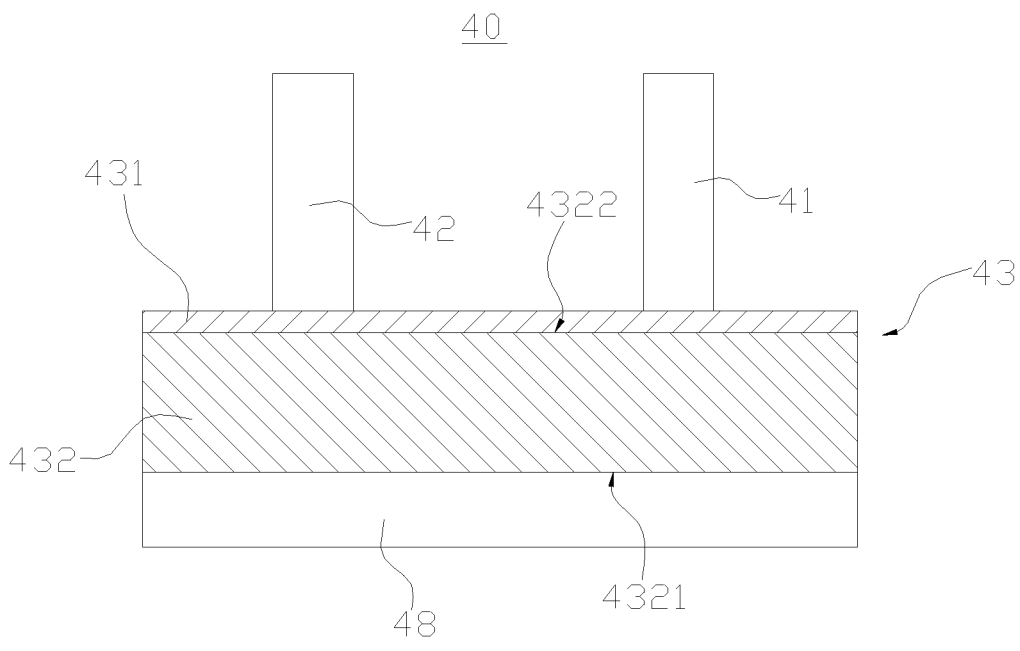
FIG. 16 is a schematic diagram of an equipotential structure (a fourth possible structural form of the equipotential apparatus) provided in some embodiments of the present application.

It can be known from the above embodiments that the equipotential apparatus 43 can be arranged between the first electric conductor 41 and the second electric conductor 42 to achieve the equipotential connection between the first electric conductor 41 and the second electric conductor 42, that is, the first electric conductor 41 and the second electric conductor 42 are respectively located at two opposite sides of the equipotential apparatus 43. In some embodiments, as shown in FIG. 16, the first electric conductor 41 and the second electric conductor 42 can also be arranged at one same side of the equipotential apparatus 43. In this case, one side of the equipotential apparatus 43 opposite to the first electric conductor 41 and the second electric conductor 42 can abut against a fixing member 48. Under the effect of the elastic support force of the elastic support 432, the electrically-conductive member 431 can be squeezed to both the first electric conductor 41 and the second electric conductor 42.

Illustratively, the electrically-conductive member 431 can only cover the second surface 4322 of the elastic support 432 and the first surface 4321 of the elastic support 432 is used for abutting against the fixing member 48. Certainly, the electrically-conductive member 431 can be made of a flexible material and can also be made of a rigid material. The electrically-conductive member 431 can be bonded together with the elastic support 432 through conductive adhesives.

Figure 17:
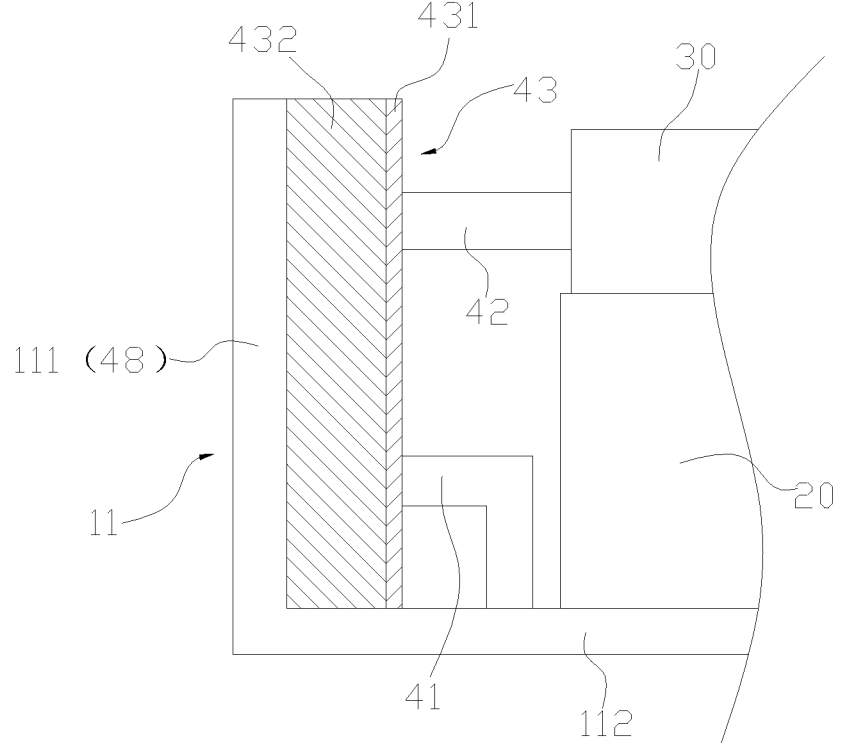
FIG. 17 is a partial view of a battery provided in some embodiments of the present application.

As shown in FIG. 17, in the battery 100 (shown in FIG. 2), the fixing member 48 can be a side wall 111 of the box body 11 and the first electric conductor 41 can be a metal conductor that protrudes outside the bottom wall 112 of the box body 11.

It should be noted that the equipotential apparatus 43 provided in embodiments of the present application is not restricted to application to the battery 100 only, and the equipotential apparatus 43 provided in embodiments of the present application can be used to achieve equipotential of two electric conductors as long as a potential difference may occur between two electric conductors.

It should be noted that in absence of a conflict, embodiments of the present application and features in the embodiments may be combined to each other. Although the present application has been described with reference to preferred embodiments, various improvements can be made thereto and equivalents can be used for replacement of members therein without departing from the scope of the present application. In particular, as long as a structural conflict does not exist, each technical feature mentioned in each embodiment can be combined in any manner. The present application is not restricted to particular embodiments disclosed herein, but to include all technical solutions falling in the scope of the claims.

What is claimed is:

1. A battery, comprising:

an equipotential structure comprising a first electric conductor, a second electric conductor, a middle electric conductor and an equipotential apparatus;

wherein the middle electric conductor is provided on the first electric conductor and/or the second electric conductor, and the middle electric conductor is configured to be a conducting strip bent in a Z shape;

wherein the equipotential apparatus comprises an electrically-conductive member; and an elastic support, wherein the electrically-conductive member is at least partially arranged on a surface of the elastic support, and the elastic support is configured to provide an elastic support force for the electrically-conductive member so as to squeeze the electrically-conductive member between the first electric conductor and the middle electric conductor, or squeeze the electrically-conductive member between the middle electric conductor and the second electric conductor, or squeeze the electrically-conductive member between the middle electric conductor to achieve an equipotential connection between the first electric conductor and the second electric conductor.

2. The battery according to claim 1, wherein the elastic support comprises a first surface and a second surface that are opposite to each other;

the electrically-conductive member comprises a first conductive portion, a second conductive portion and a third conductive portion, the first conductive portion being connected to the second conductive portion through the third conductive portion;

the first conductive portion covers the first surface and the first conductive portion is configured to be squeezed to the first electric conductor; and the second conductive portion covers the second surface and the second conductive portion is configured to be squeezed to the second electric conductor.

3. The battery according to claim 1, wherein the electrically-conductive member and the first electric conductor are connected to each other through a first conductive adhesive layer; and/or the electrically-conductive member and the second electric conductor are connected to each other through a second conductive adhesive layer.

4. The battery according to claim 1, wherein the equipotential structure further comprises a connector; and the connector is configured to connect the equipotential apparatus between the first electric conductor and the second electric conductor.

5. The battery according to claim 1, further comprising:

a box comprising the first electric conductor;

a battery unit accommodated in the box; and a thermal management member for managing a temperature of the battery unit, the thermal management member comprising the second electric conductor.

6. The battery according to claim 1, wherein a first hole supplied for a connector to pass through is provided on the elastic support.

7. The battery according to claim 6, wherein a second hole and a third hole supplied for the connector to pass through and located at two axial ends of the first hole are provided on the electrically-conductive member.

8. The battery according to claim 1, wherein the electrically-conductive member is made of a flexible material.

9. The battery according to claim 8, wherein the electrically-conductive member covers the surface of the elastic support at a complete circle along a circumferential direction.

10. The battery according to claim 8, wherein the electrically-conductive member comprises one or more of a conductive cloth, a tin foil paper and an aluminum foil paper.

11. An electric device, comprising the battery according to claim 1.

* * * * *